United States Patent [19]

Ono

[11] Patent Number: 5,937,346

[45] Date of Patent: Aug. 10, 1999

[54] RADIO UNIT, SYSTEM AND METHOD FOR STORING INFORMATION REGARDING AN ILLEGAL ACCESS TO THE RADIO UNIT

[75] Inventor: Hiroshi Ono, Tokyo, Japan

[73] Assignee: NEC Corporation, Tokyo, Japan

[21] Appl. No.: 08/670,061

[22] Filed: Jun. 25, 1996

[30] Foreign Application Priority Data

Jun. 28, 1995 [JP] Japan .................................... 7-161331

[51] Int. Cl.$^6$ ................................................. H04M 11/00
[52] U.S. Cl. ...................... 455/411; 340/825.34; 455/566
[58] Field of Search ..................... 455/411, 410, 455/38.1–38.3, 557, 566, 343; 379/144–145; 340/825.31, 825.34, 825.44, 825.54, 311.1, 543, 505

[56] References Cited

U.S. PATENT DOCUMENTS

| | | | |
|---|---|---|---|
| 4,408,119 | 10/1983 | Decavele | 235/382 |
| 4,962,544 | 10/1990 | Igari | 455/186.2 |
| 5,073,767 | 12/1991 | Holmes et al. | 340/311.1 |
| 5,373,289 | 12/1994 | Ichinohe | 340/311.1 X |
| 5,430,892 | 7/1995 | Motegi | 455/38.2 X |
| 5,559,505 | 9/1996 | McNair | 340/825.31 |

FOREIGN PATENT DOCUMENTS

| | | |
|---|---|---|
| 240930 | 8/1992 | Japan . |
| 48519 | 2/1993 | Japan . |
| 2 252 692 | 8/1992 | United Kingdom . |
| 2 267 166 | 11/1993 | United Kingdom . |

*Primary Examiner*—Thomas Mullen
*Attorney, Agent, or Firm*—Sughrue, Mion, Zinn, Macpeak & Seas, PLLC

[57] ABSTRACT

The present invention comprises a ROM 5 for storing a password, a password check section 9, a RAM 10 for storing a number of password mismatch occurrences, a radio section 1, and a central processing unit 12 for controlling the memory, radio and checking sections. When a password for rewriting individual information is input from an external terminal 50, the central processing unit 12 requests the password check section 9 to check the password with a password stored in the ROM 5. When the both passwords don't match, a password can be repeatedly re-input until the password matches and the number of password mismatch occurrences is stored in the RAM 10.

18 Claims, 8 Drawing Sheets

FIG.5(A) NORMAL POWER OPERATION OF RECEIVING CIRCUIT

FIG.5(B) EXAMPLE-1 OF POWER OPERATION OF RECEIVING CIRCUIT WHEN NUMBER OF TIMES OF CHECK ERRORS EXISTS

FIG.5(C) EXAMPLE-2 OF POWER OPERATION OF RECEIVING CIRCUIT WHEN NUMBER OF TIMES OF CHECK ERRORS EXISTS

FIG.5(D) TIMING AT WHICH RECEIVED DATA IS REGARDED AS VALID $t, t_2$: TIME INTERVAL WHERE EXCESS POWER IS SUPPLIED TO RECEIVING CIRCUIT

FIG.8

RADIO UNIT, SYSTEM AND METHOD FOR STORING INFORMATION REGARDING AN ILLEGAL ACCESS TO THE RADIO UNIT

BACKGROUND OF THE INVENTION

The present invention relates to a radio unit with a security function against robbery and, more particularly, to the radio unit with a function to display information regarding an illegal access from an external terminal.

Conventionally, using a Read Only Memory (referred to as ROM, hereinafter) writer and the like it is possible to change information, such as a call number, stored in the radio unit from the external terminal. First an access password is input to the radio unit from the ROM writer and the like. The password should match with a password stored in the radio unit. Only when the passwords match each other can individual information, such as the call number, be changed. This prevents information of a stolen radio unit from being changed.

A radio unit in the prior art for preventing an illegal access is disclosed in Japanese Patent Laid Open No. 48519 (1993). In this prior art, a data control unit checks a radio unit password stored in a memory of the control section with a password stored in a ROM for an individual selection number of the individual selection call receiver. When the check result indicates mismatching, the ROM for the individual selection number cannot be read/written.

Another prior art apparatus for preventing an illegal access is disclosed in Japanese Patent Laid Open No. 240930 (1992). In this prior art, an input password and a password stored in a receiving unit are compared and acceptance of the password is stopped if the number of occurrences of password mismatching exceeds a preset value.

Changing individual information, such as a call number, is primarily changed by an authorized user, radio system operator or its agent. The authorized user may make a password input error once or a few times.

However, according to the prior art disclosed in Japanese Patent Laid Open No. 48519(1993), the ROM for individual selection number cannot be read/written after a password mismatch occurs.

Similarly, in the prior art disclosed in Japanese Patent Laid Open No. 240930 (1992), the ROM for individual selection number cannot be read/written if an incorrect password is entered a predetermined number of times.

Also, in Japanese Patent Laid Open No. 240930(1992), the apparatus allows access to individual information and automatically deletes password input error history when password matching is detected within a predetermined number of times even if password mismatching has previously occurred.

In these conventional devices, however, it is not possible to ascertain that the radio unit, of which individual information was rewritten by a robber, is a stolen one.

SUMMARY OF THE INVENTION

It is an object of the present invention to solve the aforementioned problems.

It is another object of the present invention to provide an apparatus and method for enabling re-input of a password repeatedly even if an erroneous password is input and to store the number of occurrences of password input errors.

The objects of the present invention are achieved by a radio unit comprising:

first storing means for storing a password;

checking means for checking a password input from an external terminal with the password read from the first storing means;

second storing means for storing a number of password mismatch occurrences that occur in the checking means; and control means for outputting matching information when a check result of the checking means indicates matching, and for allowing the external terminal to re-input a password to allow the checking means check the re-input password and storing a number of password mismatch occurrences in the second storing means when a check result of the checking means indicates mismatching.

Furthermore, the objects of the present invention are achieved by a system for storing information regarding illegal access to a radio unit having a radio unit and an external terminal for rewriting individual information for the radio unit, wherein the radio unit comprises:

first storing means for storing the individual information for the radio unit;

second storing means for storing a password used by the external terminal for an access to the radio unit;

checking means for checking a password input from the external terminal with the password read from the second storing means;

third storing means for storing a number of password mismatch occurrences in the checking means; and control means for outputting matching information when a check result of the checking means indicates matching, and letting the external terminal re-input a password to let the checking means check the password and storing a number of occurrences of password mismatching in the third storing means.

Moreover, the objects of the present invention are achieved by a method for storing information regarding an illegal access to the radio unit comprising the steps of:

storing in advance a password used by the external terminal for an access to the radio unit;

checking a password input from the external terminal with the stored password;

outputting matching information when having detected password matching in the checking step, and allowing the external terminal to re-input a password to re-check the password and storing a number of password mismatching occurrences when having detected password mismatching in the checking step.

The present invention permits the external terminal to re-input a password until the password matches with the radio unit password even if the access password from the external terminal mismatches with the stored radio unit password. Therefore an authorized user or the like, can re-input a password any number of times even if the user makes a mistake in inputting the password.

Furthermore, the number of occurrences of password mismatching is stored in the storing means. Therefore, it is possible to confirm password input errors by reading the contents stored in the storing means to know the number of times that password mismatching has occurred.

Described as above, the present invention allows an authorized user to repeatedly re-input a password.

Furthermore, because the number of times of password mismatching is stored, it is possible to ascertain that the wrong passwords had been input even if a robber accidentally succeeded in writing individual information after many attempts at inputting an appropriate password. As a result, it is possible to easily detect whether the radio unit is a stolen article.

BRIEF DESCRIPTION OF THE DRAWINGS

This and other objects, features and advantages of the present invention will become more apparent upon a reading of the following detailed description and drawings, in which:

FIG. 5 (A) to (D) are timing charts of an operation of a fourth embodiment;

DESCRIPTION OF THE PREFERRED EMBODIMENTS

Figure 1:
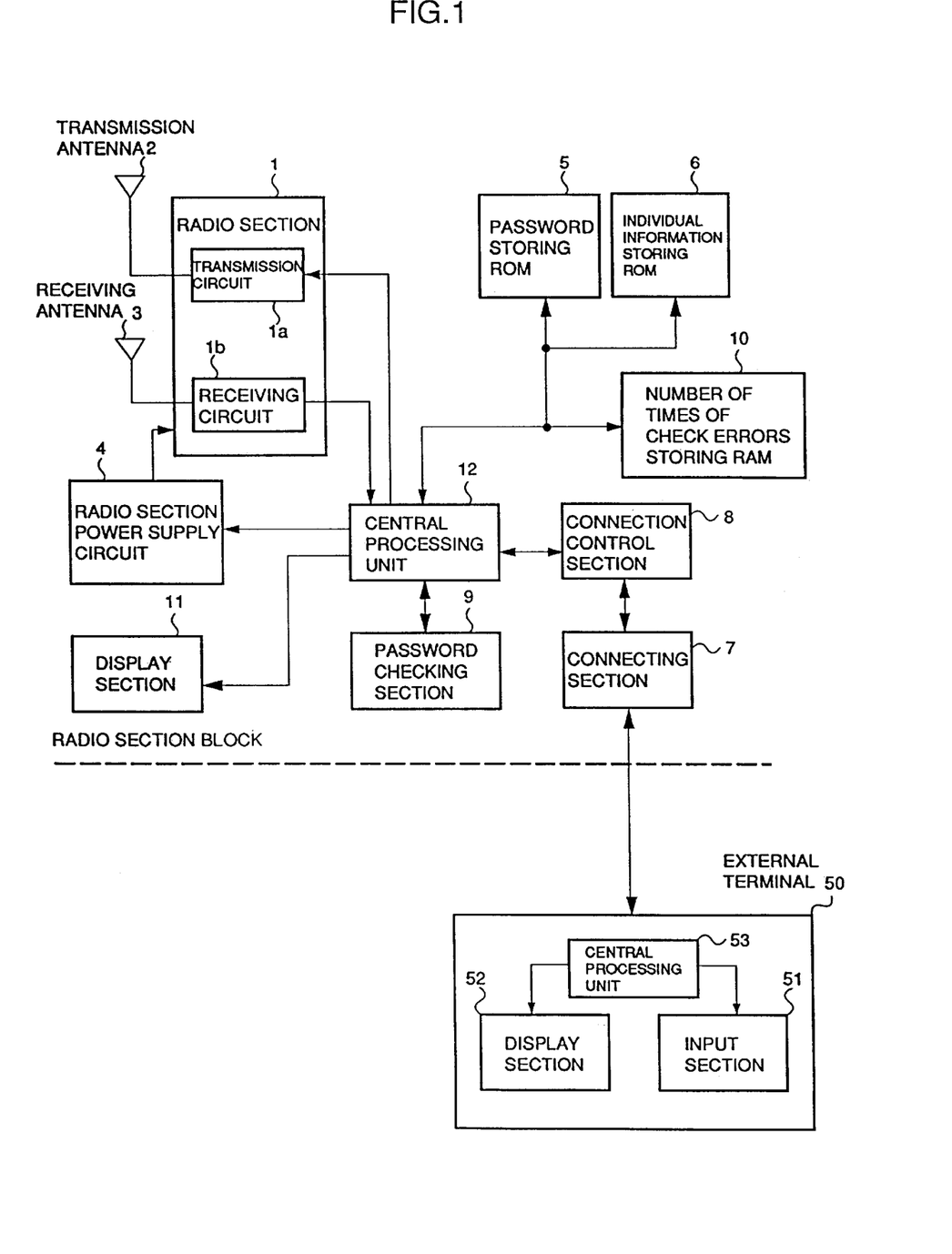
FIG. 1 is a block diagram of a radio unit and an external terminal.

An embodiment of the present invention is described. FIG. 1 is a block diagram of a radio unit and an external terminal of the present embodiment.

The radio unit comprises a radio section 1 having a transmission circuit 1a and a receiving circuit 1b, a transmission antenna 2 for the transmission circuit 1a, a receiving antenna 3 for the receiving circuit 1b, and a radio section power supply circuit 4 for supplying power to the transmission circuit 1a and the receiving circuit 1b.

The radio unit also comprises a ROM 5 for storing the radio unit access password and a ROM 6 for storing radio unit information such as a call number and the like.

Moreover, the radio unit comprises a connection section 7 for connecting an external terminal 50 to rewrite the individual information and a connection control section 8 for controlling communication with the external terminal 50.

Furthermore the radio unit comprises a password check section 9 for checking a password input from the external terminal 50 with the radio unit password read from the ROM 5, a Random Access Memory (referred to as RAM, hereinafter) 10 for storing a number of times a check error occurs (indicating a password mismatch), and a display section 11 for displaying the number of check error occurrences when the number of check errors exceeds a preset value.

Furthermore, the radio unit comprises a central processing unit 12 for controlling the transmission circuit 1a, the receiving circuit 1b, the radio section power supply circuit 4, the ROM 5, the ROM 6, the connection control section 8, the password check section 9, the RAM 10 for storing the number of check errors, and the display section 11.

It is to be noted that the ROM 6, comprises a rewritable EPROM or EEPROM through the external terminal 50.

The external terminal 50, that is a ROM writer, comprises an input section 51 for inputting commands and a password, a display section 52 for displaying data and a central processing unit 53 for controlling the input section 51 and the display section 52.

Next, an operation of the present embodiment is explained, referring to a flow chart and a timing chart as described later, each operation is processed through control by the central processing unit 12.

Figure 2:
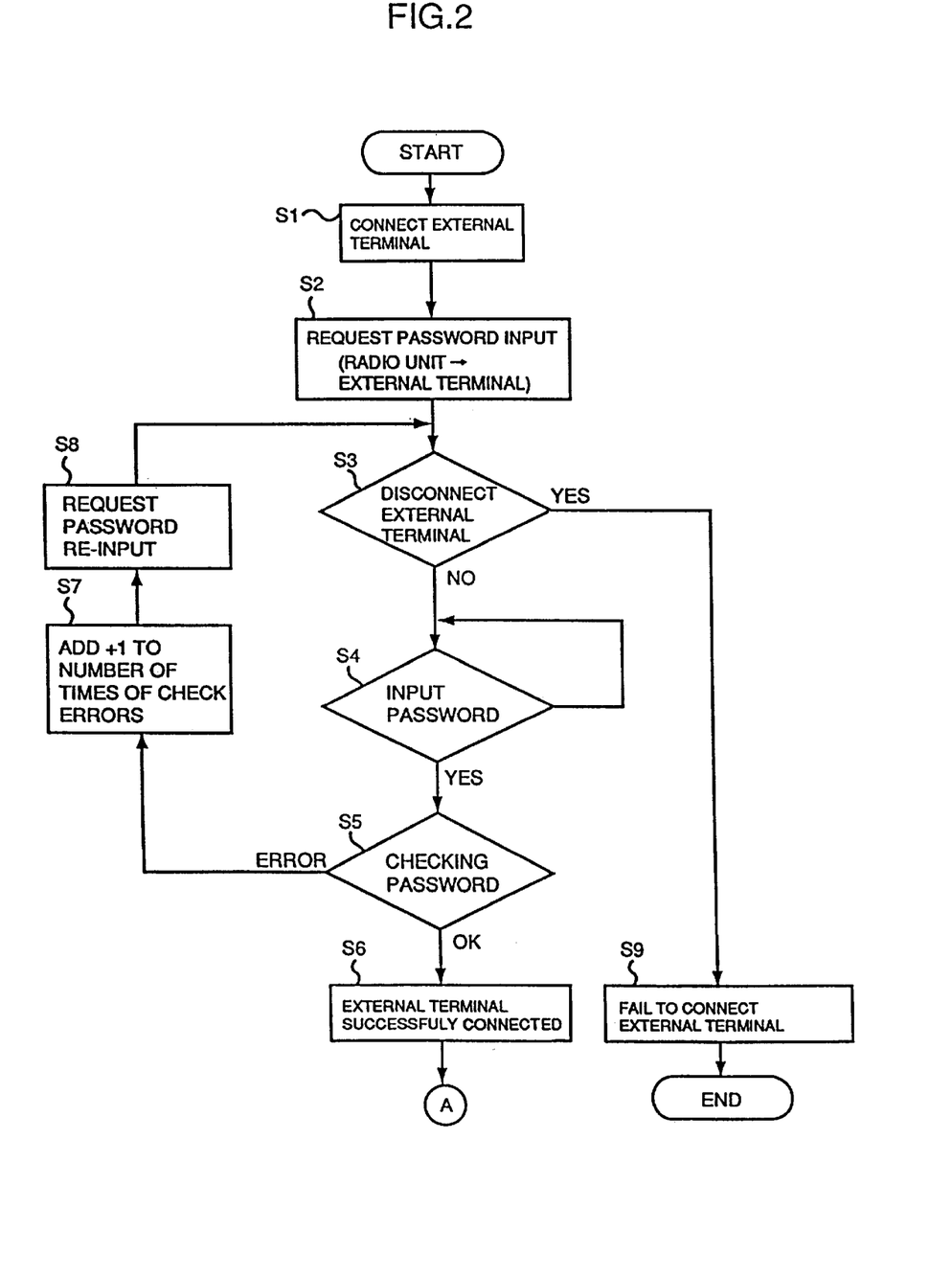
FIG. 2 is a flowchart of an operation of a first embodiment.

The first embodiment is explained. FIG. 2 is a flow chart showing an operation of the first embodiment.

First, the external terminal 50 is connected to the connection section 7 (S1), a central processing unit 12 makes an input request to the external terminal 50 (S2). While the external terminal 50 is connected to the connection section 7, the central processing unit 12 awaits an input of a password from the external terminal 50 (S3, connected condition).

Then, a password is input from the external terminal 50 (S4), the central processing unit 12 requests the password check section 9 to check a password input from the external terminal 50 with a password read from the ROM 5 (S5). When both passwords match, the external terminal is successfully connected (S6).

When the passwords don't match (ERROR of S5), the central processing unit 12 adds one (+1) to the number of check error occurrences (S7). The resulting sum is stored in the RAM 10. Then, the central processing unit 12 requests the external terminal 50 to re-input a password (S8). And the process returns to S3.

As described above, inputting of password is continued until two passwords match or the external terminal 50 is disconnected. When the external terminal 50 is disconnected (S3, disconnected condition), the process ends in unsuccessful connection of the external terminal 50 (S9).

Figure 3:
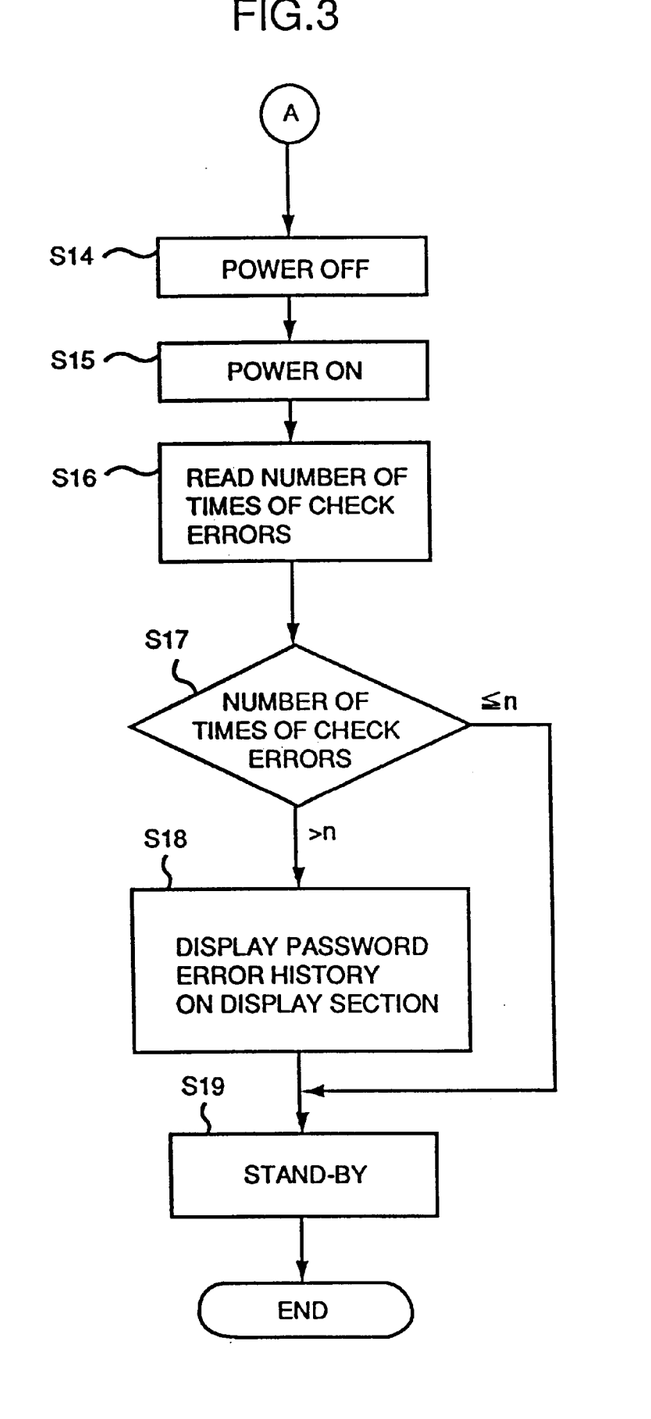
FIG. 3 is a flowchart of an operation of a second embodiment.

Next, an operation of the second embodiment is explained. FIG. 3 is a flow chart showing an operation of the second embodiment. In the second embodiment, the RAM 10 has its own backup power supply (not shown in the figure). So, even if the radio section power supply circuit 4 is turned off, data concerning the number of check error occurrences stored in the RAM 10 is not deleted.

The flow of the second embodiment is continued from S6 in the first embodiment.

First, the central processing unit 12 temporarily turns off the radio section power supply circuit 4 to stop operations of the transmission circuit 1a and the receiving circuit 1b (S14).

Next, the central processing unit 12 turns on the radio section power supply circuit 4 (S15). Then, the central processing unit 12 reads the number of check error occurrences from the RAM 10 (S16), and checks the read number of check error occurrences with a preset number "n" ("n" is a positive integer) (S17). When the number of check error occurrences exceeds the preset number "n", information indicating that a wrong password has been input to the radio unit is displayed (S18). Then the process enters standby (S19).

When the number of check error occurrences, or password mismatch occurrences, does not exceed the preset number "n" (S17), the process enters standby with no display (S19).

It is desirable that the value of "n" is set to about "5" for example, which exceeds the number of times of password input attempts (an expected value). It is not to display the information in case of erroneous password input.

Figure 4:
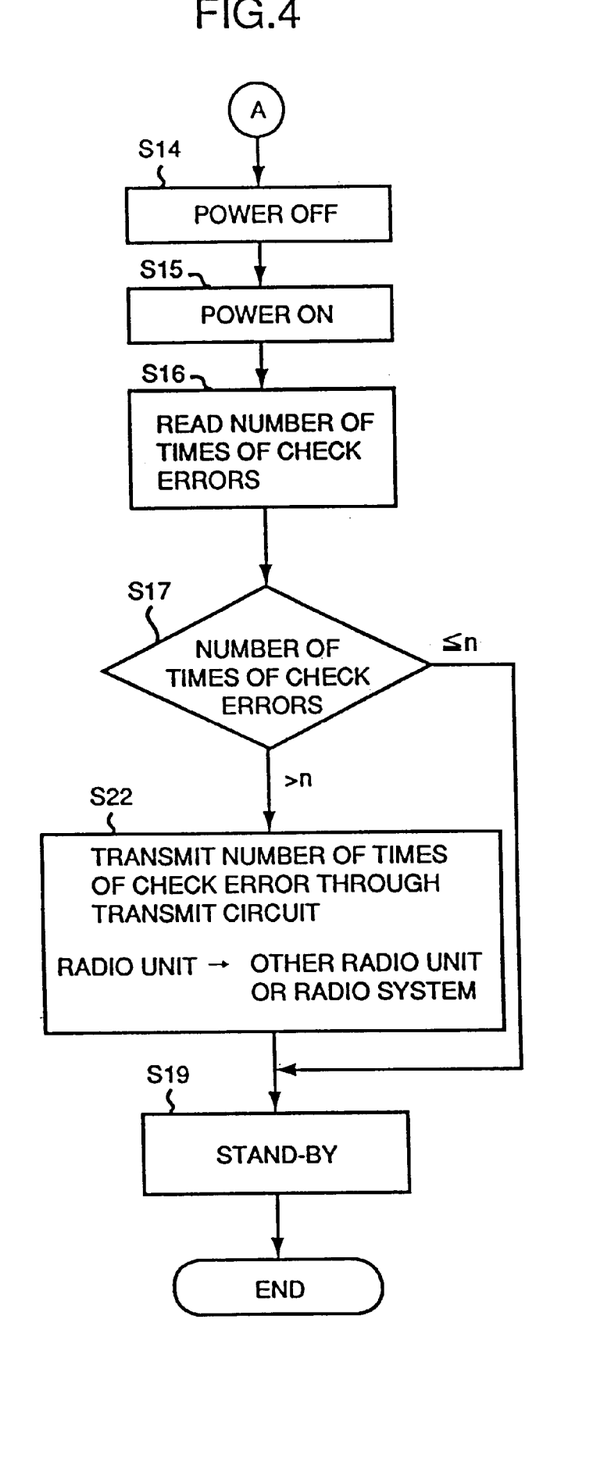
FIG. 4 is a flowchart of an operation of a third embodiment.

In the third embodiment, turning on the radio section power supply circuit 4 is specified as a starting factor for an operation to display a password check error. The periodic displaying and other operations can also be specified as a starting factor.

Next, an operation of the third embodiment is explained. FIG. 4 is a flowchart showing an operation of the third embodiment. Also, in the third embodiment, the RAM 10 has its own backup power supply (not shown in the figure). So, the data of the number of times of check errors stored in the RAM 10 is not deleted even if a radio section power supply circuit 4 is turned off.

The flow of the third embodiment is continued from S6 in the first embodiment.

First, the central processing unit 12 temporarily turns off the radio section power supply circuit 4 to stop the transmission circuit 1a and the receiving circuit 1b (S14).

Next, the central processing unit 12 turns on the radio section power supply 4 (S15). Then, the central processing unit 12 reads the number of times a check error has occurred from the RAM 10 (S16), and checks the read number with a present number "n" ("n" is a positive integer) (S17). When the number of times of check errors exceeds "n", the central processing unit 12 sends data corresponding the number check errors to another station, that is, another radio unit or radio system via the transmission circuit 1a and the transmission antenna 2 (S22). Then, the process enters standby (S19). As a result, the other station can know that a wrong password has been input in the radio unit.

Otherwise, the number of times of check errors does not exceed "n" (S17), and the process enters standby with no display.

It is desirable that the value of "n" is set to about "5" for example, which exceeds the number of times of password input attempts (an expected value). It is not to display the information in case of erroneous password input.

In the second embodiment, turning on the radio section power supply circuit 4 is specified as a starting factor for an operation to display a password check error. Similarly, periodic displaying and other operations can also be specified as a starting factor.

Next, an operation of the fourth embodiment is explained. Parts (A) to (D) of FIG. 5 are timing charts showing an operation of the fourth embodiment.

Figure 5A:
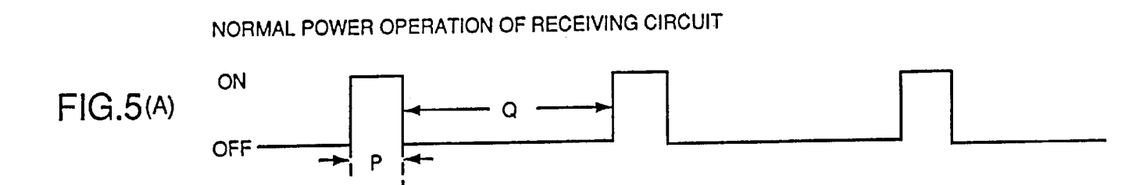

In the fourth embodiment, the radio section power supply circuit 4 intermittently supplies power to the receiving circuit 1b at least as illustrated in FIG. 5(A).

As illustrated in FIG. 5(A), repeating a pattern where the electric power is being supplied during the time period P and not being supplied during the time period Q to the receiving circuit 1b helps save energy to prolong the life of a battery. Power is being supplied to the receiving circuit 1b during a time period long enough to estimate a timing when a required signal appears or to check if the signal has been transmitted.

For the above purpose, the central processing unit 12 controls the radio section power supply 4 to prolong the time for supplying power according to the number of check errors of the password. When the receiving circuit 1b operates in a period unnecessary for receiving data, it wastes battery power.

Therefore, as the number of times a check errors of the password increases, the later the operation of the receiving circuit 1b can be stopped. That is, it is possible to stop the function of the radio unit for example, in FIG. 5(B), when the number of times of check errors reaches a preset number of times, the power is supplied to the receiving circuit 1b for an additional time t.

Figure 5B:
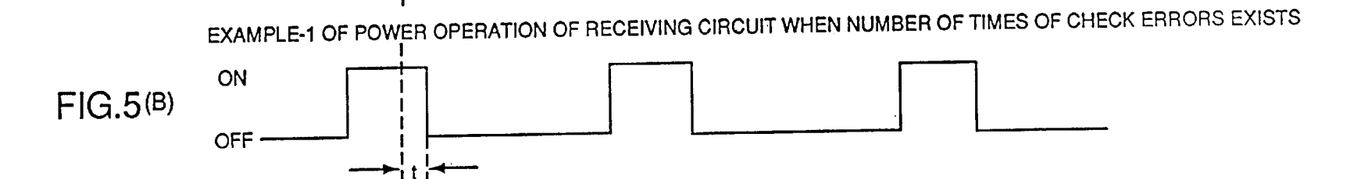
Figure 5C:
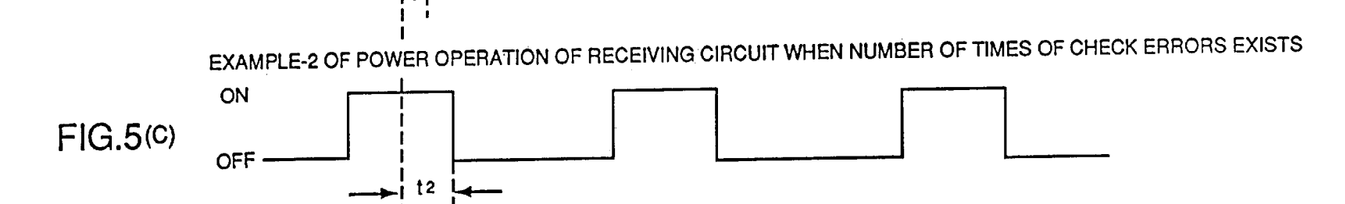

As shown in FIG. 5(C), when the number of times of check errors exceeds the case corresponding to FIG. 5(B), power is supplied for an additional time "t2", which is longer than time "t".

Figure 5D:
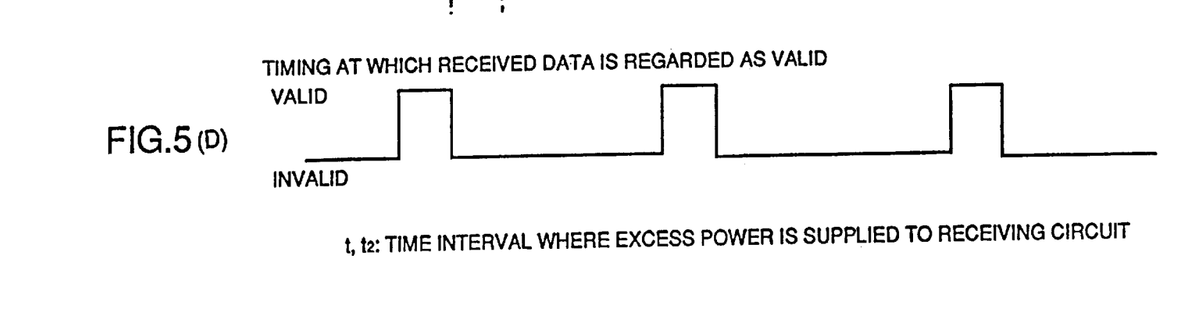

FIG. 5(D) shows a timing to decide that receiving data is valid. Power is synchronously supplied with the timing to the receiving circuit 1b as shown in FIG. 5(A).

Figure 6:
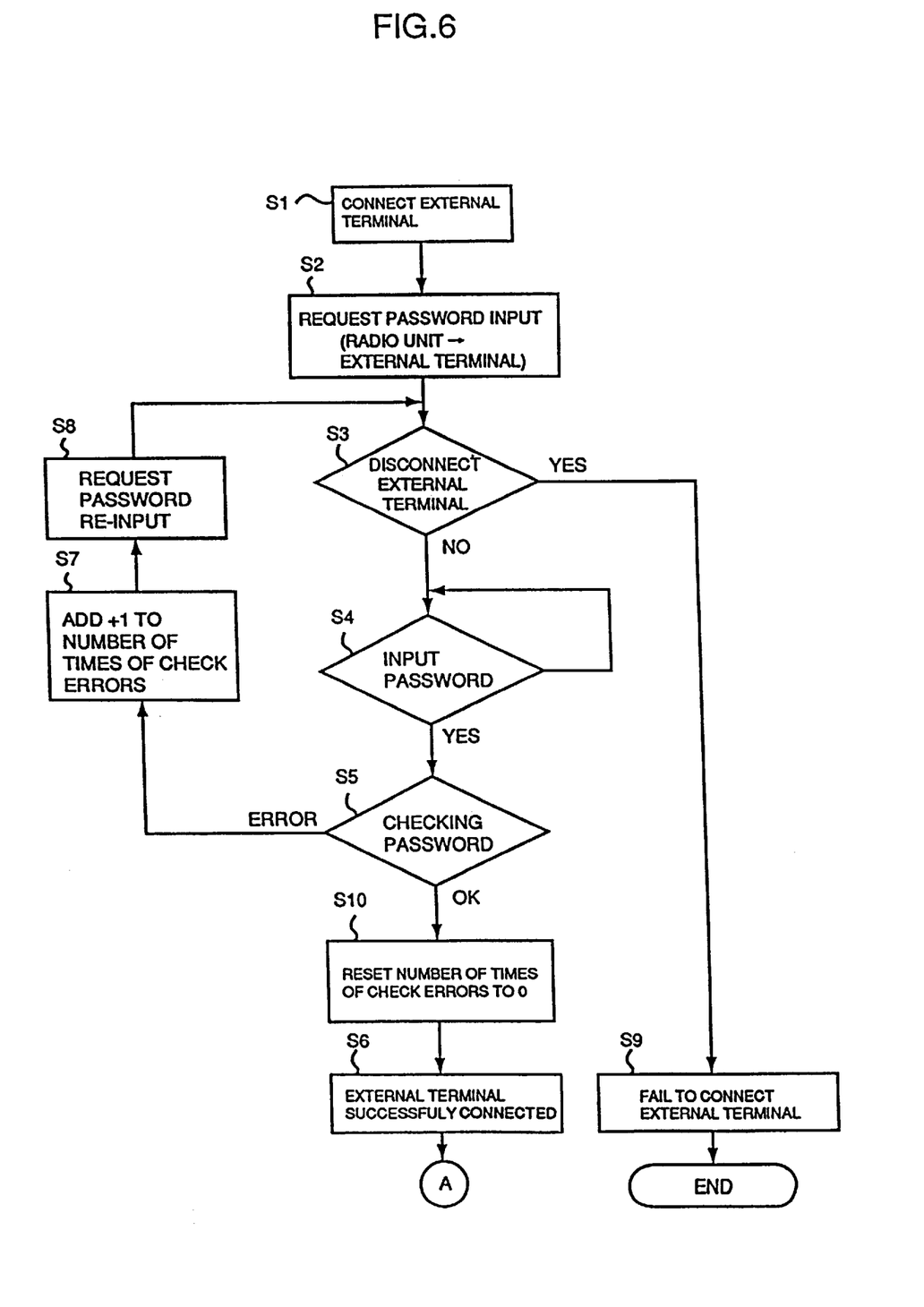
FIG. 6 is a flowchart of an operation of a fifth embodiment.

Next, an operation of the fifth embodiment is explained. FIG. 6 is a flow chart of the fifth embodiment. In the flow of the operation of the fifth embodiment, S10 is inserted between S5 and S6 in the flow of the first embodiment.

The fifth embodiment is so constructed to have a clearing function, because the data corresponding to the number of check error occurrences stored in the RAM 10 is a result of input errors by an authorized user.

When passwords are checked and they match in S5, the central processing unit 12 clears (resets to zero) data of the number of check errors stored in the number of times of check errors storing RAM 10 (S10). And the external terminal is successfully connected (S6).

The passwords aforementioned can be the access password being used or other password different from the radio unit access password.

By constructing a radio unit as described above, displaying the number of times of check errors and transmitting the data to another station can be performed. In addition, wasting battery power and so on can be avoided in accordance with the number of check error occurrences.

Figure 7:
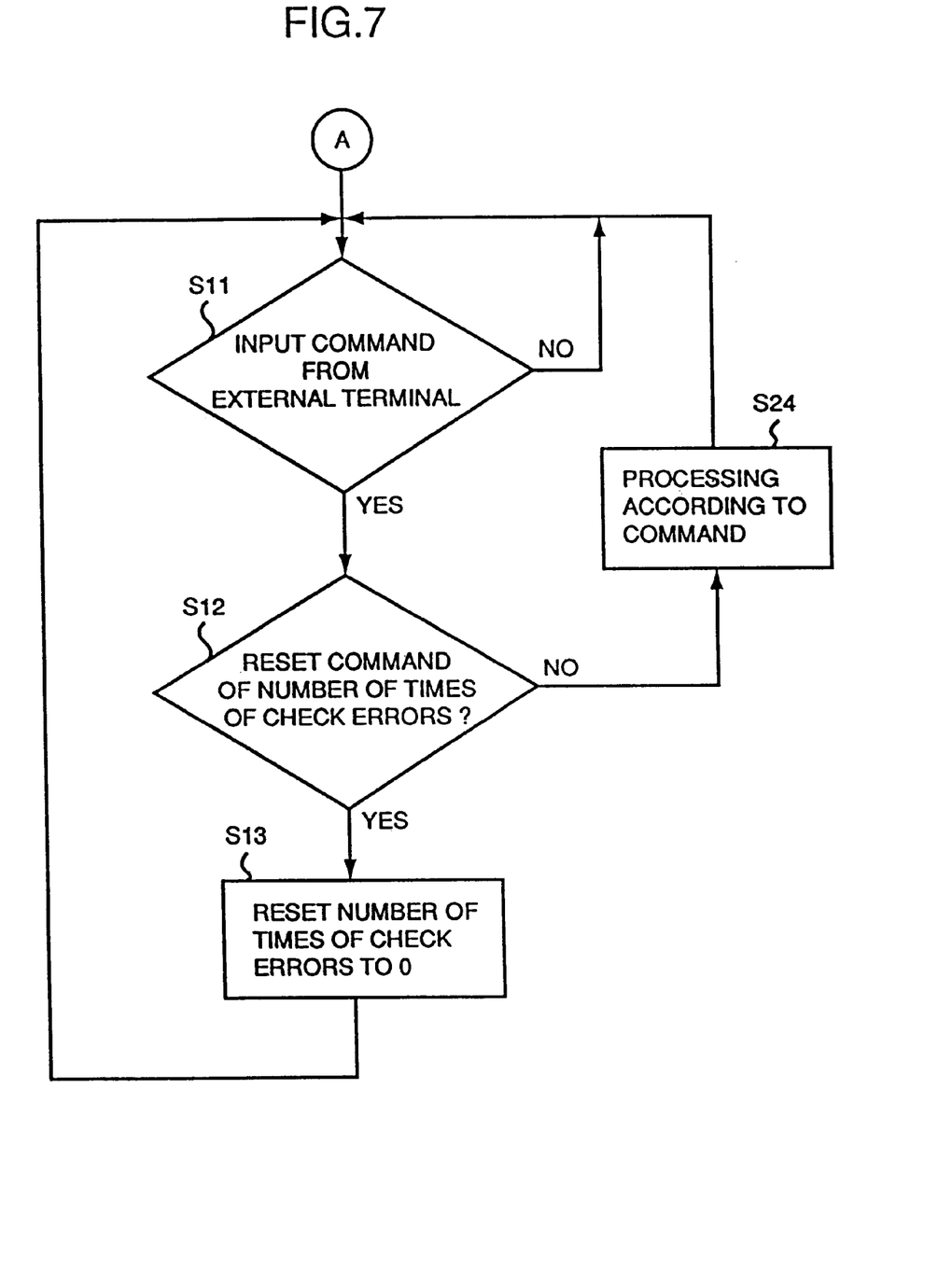
FIG. 7 is a flowchart of an operation of a sixth embodiment.

Next, the sixth embodiment is explained. FIG. 7 is a flow chart showing an operation of the sixth embodiment.

The sixth embodiment shows an operation after a successful connection of the external terminal 50 in S6 in the first embodiment.

First, after the external terminal 50 is successfully 5 connected in S6, the central processing unit 12 waits for a command from the external terminal 50 (S11). In response to the command input from an input means 51 and the central processing unit 53 of the external terminal 50, the central processing unit 12 checks whether the command is a reset command (S12). When the command is the reset command, the central processing unit 12 clears (resets to zero) the data corresponding to the number of check errors stored in the RAM 10 (S13), and the process returns to S11.

On the other hand, when the command is not the reset command, the central processing unit 12 executes according to the command (S24), then the process returns to S11 after completing the execution of the command.

This allows the external terminal 50 to clear the data corresponding to the number of check errors stored in the number of times of check errors storing RAM 10.

Figure 8:
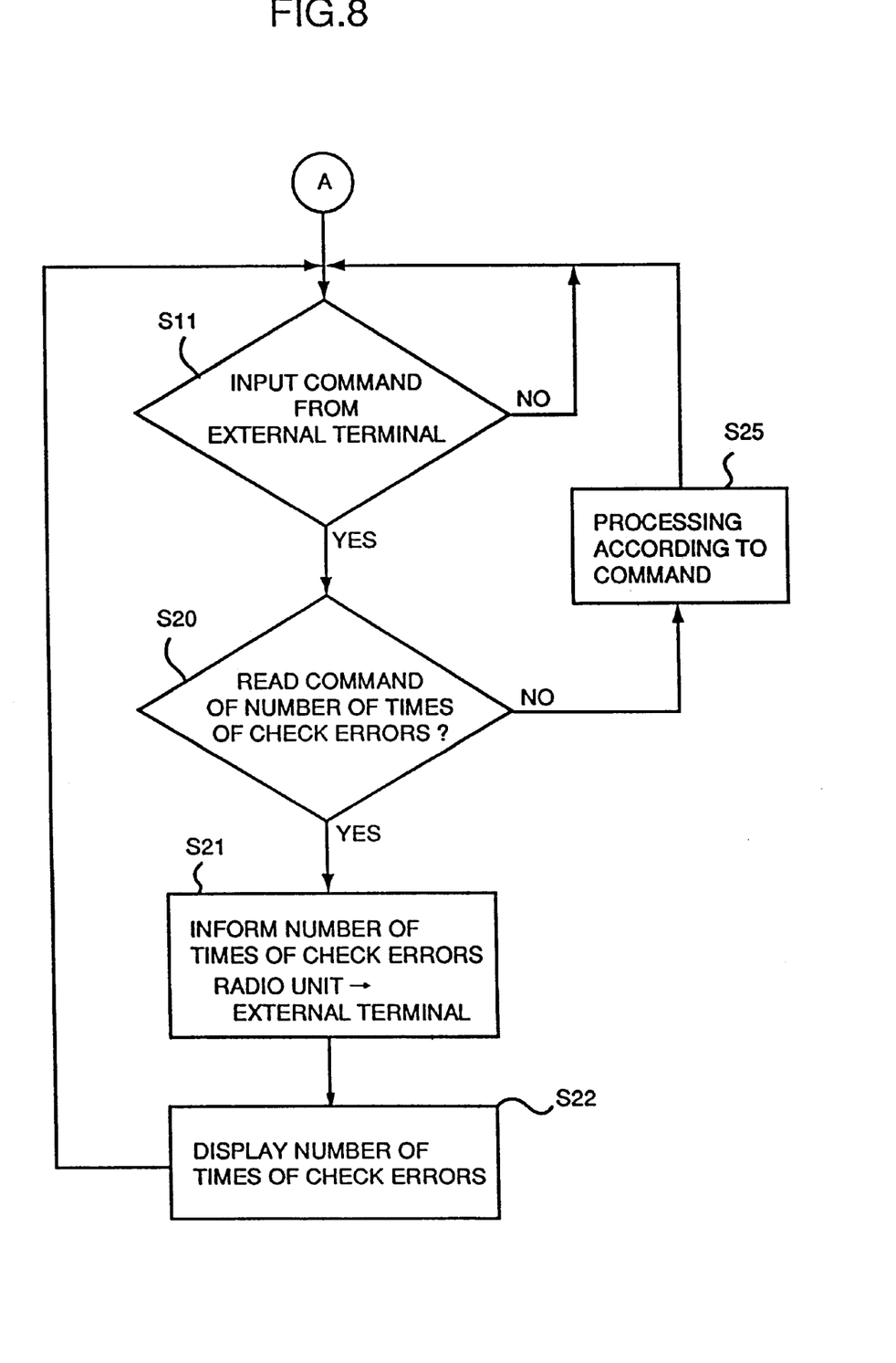
FIG. 8 is a flowchart of an operation of a seventh embodiment.

Next, the seventh embodiment is explained. FIG. 8 is a flow chart showing an operation of the seventh embodiment.

In the seventh embodiment, similar to the sixth embodiment, an operation following a successful connection of the external terminal 50 in S6 in the first embodiment.

First after the external terminal 50 is successfully connected in S6, the central processing unit 12 waits for a command input from the external terminal 50 (S11). In response to the command input via the input means 51 and the central processing unit 53 of the external terminal 50, the central processing unit 12 checks whether the command is a number of check errors read command (S20). When the command is a number of check errors read command, the central processing unit 12 transmits the data corresponding to the number of check errors to the external terminal 50

(S21). The external terminal 50 receives the data, the central processing unit 53 displays the number of times of check errors on the display section 52 (S22).

On the other hand, when the command is not a number of times of check errors read command, the central processing unit 12 executes the command (S25), then the process returns to S11 after completing the execution of the command.

In this way, the number of times of check errors read from the external terminal can be displayed on the external terminal.

What is claimed is:

1. A radio unit comprising:

first storing means for storing a password;

checking means for checking a password input from an external terminal with said password read from said first storing means;

second storing means for storing a number of password mismatch occurrences based on the result of said checking means; and control means for outputting matching information when a check result of said checking means indicates matching, and for allowing said external terminal to re-input a password to allow said checking means to check said re-input password with said password read from said first storing means, and storing the number of password mismatch occurrences in said second storing means when a check result of said checking means indicates mismatching, wherein said control means comprises means for requesting said external terminal to re-input a password until said password matches with a password read from said first storing means in said checking means, and said second storing means comprises means for storing the number of password mismatch occurrences even if said checking means has detected password matching.

2. The radio unit of claim 1 further comprising:

a displaying means; and, wherein said control means comprises means for displaying information indicating a password input error on said displaying means when the number of password mismatch occurrences exceeds a preset value which is stored in said second storing means.

3. A radio unit comprising:

first storing means for storing a password;

checking means for checking a password input from an external terminal with said password read from said first storing means;

second storing means for storing a number of password mismatch occurrences based on the result of said checking means;

control means for outputting matching information when a check result of said checking means indicates matching, and for allowing said external terminal to re-input a password to allow said checking means to check said re-input password with said password read from said first storing means, and storing the number of password mismatch occurrences in said second storing means when a check result of said checking means indicates mismatching; and a transmission means, wherein said control means comprises means for transmitting information indicating a password input error to another station through said transmission means when the number of password mismatch occurrences exceeds a preset value which is stored in said second storing means.

4. A radio unit comprising:

first storing means for storing a password;

checking means for checking a password input from an external terminal with said password read from said first storing means;

second storing means for storing a number of password mismatch occurrences based on the result of said checking means; and control means for outputting matching information when a check result of said checking means indicates matching, and for allowing said external terminal to re-input a password to allow said checking means to check said re-input password with said password read from said first storing means, and storing the number of password mismatch occurrences in said second storing means when a check result of said checking means indicates mismatching, wherein said radio unit comprises a receiving circuit and a power source means for intermittently supplying power to said receiving circuit; and, said control means comprises means for controlling said power source means to vary a time for supplying power to said receiving circuit based on said number of password mismatch occurrences stored in said second storing means.

5. The radio unit of claim 4, wherein said controlling means for controlling said power source means comprises means for prolonging a time interval for supplying power to said receiving circuit in proportion to said number of password mismatch occurrences stored in said second storing means.

6. A radio unit comprising:

first storing means for storing a password;

checking means for checking a password input from an external terminal with said password read from said first storing means;

second storing means for storing a number of password mismatch occurrences based on the result of said checking means; and control means for outputting matching information when a check result of said checking means indicates matching, and for allowing said external terminal to re-input a password to allow said checking means to check said re-input password with said password read from said first storing means, and storing the number of password mismatch occurrences in said second storing means when a check result of said checking means indicates mismatching, wherein said control means comprises means for clearing said number of password mismatch occurrences stored in said second storing means upon receipt of a reset command sent from said external terminal.

7. A radio unit comprising:

first storing means for storing a password;

checking means for checking a password input from an external terminal with said password read from said first storing means;

second storing means for storing a number of password mismatch occurrences based on the result of said checking means; and control means for outputting matching information when a check result of said checking means indicates matching, and for allowing said external terminal to re-input a password to allow said checking means to check said re-input password with said password read from said first storing means, and storing the number of password mismatch occurrences in said second storing means when a check result of said checking means indicates mismatching, wherein said control means comprises means for transmitting data corresponding to the number of password mismatch occurrences stored in said second storing means upon receipt of a command for reading said data corresponding to said number of times of password mismatch occurrences transmitted from said external terminal.

8. A system for storing information regarding illegal access to a radio unit having a radio unit and an external terminal for rewriting individual information for said radio unit, wherein said radio unit comprises:

first storing means for storing said individual information for said radio unit;

second storing means for storing a password used by said external terminal for accessing said radio unit;

checking means for checking a password input from said external terminal with said password read from said second storing means;

third storing means for storing a number of password mismatch occurrences based on the result of said checking means; and control means for outputting matching information when a check result of said checking means indicates matching, and for allowing said external terminal to re-input a password to allow said checking means to check said re-input password with said password read from said second storing means, and storing the number of password mismatch occurrences in said third storing means when a result of said checking means indicates mismatching, wherein said control means comprises means for requesting said external terminal to re-input a password until said password matches with said password stored in said second storing means, and said third storing means stores the number of password mismatch occurrences even if said checking means has detected password matching.

9. The system for storing information regarding illegal access to a radio unit of claim 8, wherein said radio unit further comprises a displaying means, and wherein said control means comprises means for displaying information indicating a password input error on said displaying means when the number of password mismatch occurrences stored in said third storing means exceeds a preset value.

10. A system for storing information regarding illegal access to a radio unit having a radio unit and an external terminal for rewriting individual information for said radio unit, wherein said radio unit comprises:

first storing means for storing said individual information for said radio unit;

second storing means for storing a password used by said external terminal for accessing said radio unit;

checking means for checking a password input from said external terminal with said password read from said second storing means;

third storing means for storing a number of password mismatch occurrences based on the result of said checking means;

control means for outputting matching information when a check result of said checking means indicates matching, and for allowing said external terminal to re-input a password to allow said checking means to check said re-input password with said password read from said second storing means, and storing the number of password mismatch occurrences in said third storing means when a result of said checking means indicates mismatching; and a transmission means, wherein said control means comprises means for transmitting information indicating password input error through said transmission means to another station when the number of password mismatch occurrences stored in said third storing means exceeds a preset value.

11. A system for storing information regarding illegal access to a radio unit having a radio unit and an external terminal for rewriting individual information for said radio unit, wherein said radio unit comprises:

first storing means for storing said individual information for said radio unit;

second storing means for storing a password used by said external terminal for accessing said radio unit;

checking means for checking a password input from said external terminal with said password read from said second storing means;

third storing means for storing a number of password mismatch occurrences based on the result of said checking means;

control means for outputting matching information when a check result of said checking means indicates matching, and for allowing said external terminal to re-input a password to allow said checking means to check said re-input password with said password read from said second storing means, and storing the number of password mismatch occurrences in said third storing means when a result of said checking means indicates mismatching;

a receiving circuit;

and power source means for intermittently supplying power to said receiving circuit, wherein said control means comprises means for controlling said power source means to prolong a time interval for supplying power to said receiving circuit in proportion to said number of password mismatch occurrences stored in said third storing means.

12. A system for storing information regarding illegal access to a radio unit having a radio unit and an external terminal for rewriting individual information for said radio unit, wherein said radio unit comprises:

first storing means for storing said individual information for said radio unit;

second storing means for storing a password used by said external terminal for accessing said radio unit;

checking means for checking a password input from said external terminal with said password read from said second storing means;

third storing means for storing a number of password mismatch occurrences based on the result of said checking means; and control means for outputting matching information when a check result of said checking means indicates matching, and for allowing said external terminal to re-input a password to allow said checking means to check said re-input password with said password read from said second storing means, and storing the number of password mismatch occurrences in said third storing means when a result of said checking means indicates mismatching, wherein said external terminal comprises means for transmitting a reset command for clearing said number of password mismatch occurrences stored in said third storing means to said control means, and said control means comprises means for clearing said number of password mismatch occurrences stored in said third storing means upon receipt of said reset command.

13. A system for storing information regarding illegal access to a radio unit having a radio unit and an external terminal for rewriting individual information for said radio unit, wherein said radio unit comprises:

first storing means for storing said individual information for said radio unit;

second storing means for storing a password used by said external terminal for accessing said radio unit;

checking means for checking a password input from said external terminal with said password read from said second storing means;

third storing means for storing a number of password mismatch occurrences based on the result of said checking means; and control means for outputting matching information when a check result of said checking means indicates matching, and for allowing said external terminal to re-input a password to allow said checking means to check said re-input password with said password read from said second storing means, and storing the number of password mismatch occurrences in said third storing means when a result of said checking means indicates mismatching, wherein said external terminal comprises means for transmitting a command for reading said number of password mismatch occurrences stored in said third storing means and means for displaying information on said number of password mismatch occurrences transmitted from said control means, and said control means comprises means for transmitting data corresponding to said number of password mismatch occurrences stored in said third storing means to said external terminal.

14. A method for storing information regarding an illegal access to a radio unit comprising the steps of:

storing in advance a password used by an external terminal for access to said radio unit;

checking a password input from said external terminal with said stored password;

outputting matching information when password matching is detected in said checking step, and allowing said external terminal to re-input a password to re-check said re-input password with said stored password and storing a number of password mismatch occurrences when password mismatching is detected in said checking step; and maintaining the number of password mismatch occurrences when password matching is detected in said checking step; and displaying information indicating a password input error when said number of password mismatch occurrences exceeds a preset value.

15. A method for storing information regarding an illegal access to a radio unit comprising the steps of:

storing in advance a password used by an external terminal for access to said radio unit;

checking a password input from said external terminal with said stored password;

outputting matching information when password matching is detected in said checking step, and allowing said external terminal to re-input a password to re-check said re-input password with said stored password and storing a number of password mismatch occurrences when password mismatching is detected in said checking step; and transmitting information indicating a password input error to another station when said number of password mismatch occurrences exceeds a preset value.

16. A method for storing information regarding an illegal access to a radio unit comprising the steps of:

storing in advance a password used by an external terminal for access to said radio unit;

checking a password input from said external terminal with said stored password;

outputting matching information when password matching is detected in said checking step, and allowing said external terminal to re-input a password to re-check said re-input password with said stored password and storing a number of password mismatch occurrences when password mismatching is detected in said checking step; and controlling a time interval for supplying power to a receiving circuit of said radio unit based on said stored number of password mismatch occurrences.

17. A method for storing information regarding an illegal access to a radio unit comprising the steps of:

storing in advance a password used by an external terminal for access to said radio unit;

checking a password input from said external terminal with said stored password;

outputting matching information when password matching is detected in said checking step, and allowing said external terminal to re-input a password to re-check said re-input password with said stored password and storing a number of password mismatch occurrences when password mismatching is detected in said checking step; and transmitting a reset command for clearing data corresponding to the stored number of password mismatch occurrences; and receiving said reset command and clearing said stored number of password mismatch occurrences.

18. A method for storing information regarding an illegal access to a radio unit comprising the steps of:

storing in advance a password used by an external terminal for access to said radio unit;

checking a password input from said external terminal with said stored password;

outputting matching information when password matching is detected in said checking step, and allowing said external terminal to re-input a password to re-check said re-input password with said stored password and storing a number of password mismatch occurrences when password mismatching is detected in said checking step; and transmitting a command for reading data corresponding to said stored number of password mismatch occurrences from said external terminal;

transmitting said stored data corresponding to said number of password mismatch occurrences to said external terminal upon receipt of said command; and displaying transmitted information corresponding to said number of password mismatch occurrences in said external terminal.

* * * * *